United States Patent
Isip, Jr.

(10) Patent No.: US 6,295,539 B1
(45) Date of Patent: Sep. 25, 2001

(54) DYNAMIC DETERMINATION OF OPTIMAL PROCESS FOR ENFORCING CONSTRAINTS

(75) Inventor: Amando B. Isip, Jr., Richardson, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/151,750

(22) Filed: Sep. 14, 1998

(51) Int. Cl.[7] .................................................. G06F 17/30
(52) U.S. Cl. .................................. 707/201; 707/2; 707/3; 707/8; 707/100; 707/102
(58) Field of Search .............................. 707/2, 3, 8, 100, 707/102, 201

(56) References Cited

U.S. PATENT DOCUMENTS

| | | | |
|---|---|---|---|
| 4,933,848 | | 6/1990 | Haderle et al. .................. 707/201 |
| 4,947,320 | * | 8/1990 | Crus et al. ...................... 707/201 |
| 5,222,235 | | 6/1993 | Hintz et al. ........................ 707/7 |
| 5,386,557 | * | 1/1995 | Boykin et al. ...................... 707/1 |
| 5,396,623 | | 3/1995 | McCall et al. .................... 707/101 |
| 5,408,654 | | 4/1995 | Barry ................................ 707/101 |
| 5,485,567 | * | 1/1996 | Banning et al. ..................... 707/4 |
| 5,517,641 | | 5/1996 | Barry et al. ...................... 707/101 |
| 5,566,330 | | 10/1996 | Sheffield ............................ 707/4 |
| 5,579,515 | * | 11/1996 | Hintz et al. ........................ 707/7 |
| 5,619,692 | * | 4/1997 | Malkemus et al. .................. 707/2 |
| 5,664,217 | * | 9/1997 | Cunningham et al. .............. 710/1 |
| 5,701,480 | | 12/1997 | Raz .................................. 709/101 |
| 5,745,896 | * | 4/1998 | Vijaykumar ...................... 707/100 |
| 5,963,934 | * | 10/1999 | Cochrane et al. .................. 707/2 |
| 6,041,330 | * | 3/2000 | Carman et al. .................. 707/101 |
| 6,098,075 | * | 8/2000 | Becraft, Jr. et al. ............. 707/201 |
| 6,128,772 | * | 10/2000 | Baisley ............................. 717/3 |
| 6,151,608 | * | 11/2000 | Abrams .......................... 707/204 |

\* cited by examiner

*Primary Examiner*—Jean M. Corrielus
(74) *Attorney, Agent, or Firm*—Baker & McKenzie

(57) ABSTRACT

Performance of constraint checking is enhanced by dynamically determining an optimal process to perform the checking operation. If additional dataspace can be allocated, the parent index values are stored in the dataspace and a binary search is performed between the extracted foreign keys and the dataspace, thereby eliminating the need for a sort operation on extracted foreign keys to perform constraint checking. If all of the parent indexes needed for constraint enforcement cannot be stored in dataspace, then as many parent indexes as possible are stored in dataspace and multiple reader and multiple sort tasks are utilized to process the remaining parent indexes. Depending on the availability of resources and the characteristics of the database table, determined dynamically, complete or partial optimization of the constraint checking operation is accomplished.

10 Claims, 10 Drawing Sheets

DYNAMIC DETERMINATION OF OPTIMAL PROCESS FOR ENFORCING CONSTRAINTS

FIELD OF THE INVENTION

The present invention relates to database management systems, and particularly to a method for dynamically determining an optimal process for enforcing constraints.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. As is known in the art, address space and dataspace refer to virtual storage in an IBM MVS operating system, address space being capable of executing instructions while dataspace is a subset of address space and is limited to storing data.

For exemplary purposes, illustrated below is an order_entry table that would be stored in a tablespace. The order_entry table contains columns: customer_number; product_code; order_number; buyer_name; and ship_to_zip.

| customer_number | product_code | order_number | buyer_name | ship_to_zip |
|---|---|---|---|---|
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above order_entry table shows four rows, the table could have millions of rows for all the orders of a company, for example 4 million rows. The order_entry table also has, for example, three index keys and two foreign keys. An index key is an identifier for a particular row of a table while a foreign key also identifies a row but in addition is used for referential integrity as described below. For example, in the order_entry table, one index key could be based on order_number, another index key based on buyer_name and a third index key based on ship_to_zip.

As is known in the art, an index key for a particular table indicates a row identification (RID) and a selected value for the row (e.g., the index key value). The index key can be used to generate an index for the table which facilitates subsequent searches for particular data in the table. For example, the order_entry table would have three indexes (e.g., one for each index key), each index being stored in an indexspace. Similar to a tablespace, an indexspace is, for example, a designated portion of a DASD. Thus, if a user was looking for rows that contain a particular buyer name in the order_entry table, the database management system could query the buyer index for the table to identify all occurrences of the buyer name without reading the entire table to locate the rows.

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order-entry table) but each foreign key must be associated with a unique key in a parent table of the child table. Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has for example, a RI constraint on customer_number and product_code. As is known in the art, when a user of a DB2 database management system creates a table, the user also defines the constraints for the table (e.g., the user can define the relational integrity criteria).

Illustrated below is a product table and a customer table (e.g., the parent tables for the foreign keys in the order_entry table).

| Product Table | | |
|---|---|---|
| product_code | product_description | retail_price |
| 00010 | laptop pc | 1000.00 |
| 00020 | desktop pc | 1100.00 |
| 00030 | office pc | 1200.00 |
| 00040 | lan pc | 3500.00 |
| 00050 | home pc | 999.99 |

The product table shows five rows, although the table could have thousands of rows for all of the different products of a company. The product table has a unique index on the column product_code, which is illustrated in ascending order. The values in the column product_code are each unique since there is only one product code assigned to each product and thus in this table, a product code would not be included more than once. Accordingly, an index for the product table would include the key (e.g., the stored value in the product_code column) and a RID. The product table index would reside in a DB2 indexspace.

The customer table illustrated below shows four rows, although this table could also have thousands of rows for all of the customers of a company. The customer table has a unique index on the column customer_number, illustrated in ascending order. The values in the column customer_ number are each unique since there is only one customer number assigned to each customer name and thus a customer number would not be included in this table more than once. Accordingly, an index for the customer table would include the key (e.g., the value of the column customer_number) and a RID. The customer index would also reside in a DB2 indexspace.

| Customer Table | | |
|---|---|---|
| customer_number | buyer_name | customer_address |
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the order_entry table are valid because the foreign key values in the column product_code exist in the index of the product table and the values in the column customer_number exist in the index of the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value being in the range of 00000 to 99999.

Constraint checking is required at various times. For example, when a copy is made of a loaded database table or when a database table is recovered after a failure, DB2 will not allow access to the table until constraint enforcement is performed. Constraint checking is generally performed by a check utility, e.g., an utility designed to perform constraint checking. Examples of conventional check utilities are CHECK DATA by International Business Machines of Armonk, N.Y. and CHECKPLUS by BMC Software Co. of Houston, Tex.

FIG. 1A illustrates a prior art method for checking check constraints and referential integrity (RI) constraints. As described below, constraint checking for referential integrity performed by conventional check utilities involves execution of a sort task. A sort task places foreign key values in a collated arrangement to facilitate comparison of the foreign key values with the values in the corresponding parent index.

The operation of a conventional check utility involves reading the tablespace to extract foreign keys, passing the foreign keys to a sort operation for collating and then passing the collated foreign keys back to the check utility which reads the appropriate parent index and checks the foreign key values for validation. Reading a tablespace and a parent index in a MVS mainframe environment, required when a sort task is used for constraint checking, involves I/O operations. Each I/O operation could take as long as 35 ms. In contrast, a cpu in a MVS mainframe environment could execute 35 million to 65 million instructions per second. Therefore, utilization of I/O operations in constraint checking is a significant factor in the time required to complete the checking.

As shown in FIG. 1A, a conventional check utility would be initialized and would read the tablespace to be checked. The reading of the tablespace involves I/O operations and could be accomplished, for example, by a reader subroutine invoked by the check utility. The check utility extracts the foreign key values. The extracted foreign keys would be sorted by the sort utility to place the foreign key values in collated order for comparison with the parent index values. As known in the art, the sort utility operation also performs I/O operations.

Thus, as shown in FIG. 1A, in step 1010 a reader task reads a tablespace (e.g., reads the input file to be sorted) and in step 1020 extracts a foreign key value for each record (e.g., row) in the tablespace. If there is more than one foreign key for the record, then each of the foreign keys is extracted by the reader task. In step 1030, each foreign key value is passed to a sort task (e.g., the address of the record to be sorted is passed from the reader task to the sort utility via a memory to memory operation).

In step 1040, each foreign key value passed to the sort utility is operated upon by the sort function of the sort utility to collate the foreign key values in a conventional manner. For example, the sort operation can place the foreign key values in ascending or descending order. When the reader task reaches the end of the input file and has no more keys to pass, the sort utility completes the sorting operation (e.g., completion of any overhead operations that may be required as the actual collating operation has already been completed). As described in more detail below, the sorted foreign keys are passed to an E35 subroutine.

In step 1050, each collated foreign key value is passed by the E35 subroutine to the check utility for constraint checking. The check utility will, in step 1060, read the parent index associated with the foreign key value to be enforced and then compare the foreign key value against the parent index, as is known in the art.

Another alternative use of conventional sort utilities is to have multiple sort tasks initiated as well as multiple reader tasks to read a row and extract a foreign key and send the extracted key to the appropriate pipe for the multiple sort tasks. The pipe is, for example, the input to the E15 of the appropriate sort task, also as described in more detail below. Each of the multiple sort tasks can be assigned to a portion of the tablespace (e.g., if the tablespace is partitioned). When a block of the pipe is full (e.g., when the maximum number of keys that can be stored in the block is attained), the appropriate E15 is posted by the reader task for transfer of the block of keys.

An advantage of the above approach is less MVS overhead because for each WAIT that the E15 does (e.g., waiting to be posted by the reader task that a block of foreign keys is ready), the MVS operating system has to execute thousands of instructions. Similarly, for each POST by a reader task, the MVS operating system has to execute thousands of MVS instructions to process the POST. By using blocks, instead of performing these thousands of instructions for each row, the WAIT and POST operations only have to be performed for each block, which can each contain hundreds of keys. Each block that is posted to the E15 provides the records to be passed to the sort utility.

FIG. 1B illustrates an exemplary flowchart for the operation of a prior art sort function, such as would be used by a conventional check utility as described in FIG. 1A. In step 1100, a reader task passes a block of foreign keys to an E15 input of the sort utility, for example in a manner known in the art. In step 1110, if there are no foreign keys to pass, then the process continues at point A, described below with regard to FIG. 1D. If there are foreign keys in the block to pass to the sort operation, then in step 1120 the E15 passes a foreign key to the sort operation.

In step 1130, the foreign key is compared against the content of a current array, the current array containing the foreign keys that have already been received and collated. The initial current array would be empty. The sort utility includes, for example, temporary storage (e.g., a buffer) to store the current array of sorted foreign keys. The sort utility may process thousands of arrays storing millions of foreign keys. In step 1140, the proper sequence for placement of the foreign key in the current array is determined (e.g., comparing the foreign key against the previously received foreign keys determines where to place the foreign key in the current array). The current array is managed in step 1150 to prepare the array for insertion of the foreign key into the proper location (e.g., to manage the pointers in the array for the insertion of the foreign key). The foreign key is inserted into the current array in step 1160.

In step 1170 it is determined if the current array is full. If the array is full, in step 1180 the current array is written to an intermediate work file and the next array is started. For example, the current array is stored in an intermediate work file in DASD, as is each subsequent array when it becomes full. In step 1190, a string is built for each array stored in an intermediate file so that each array can be located and read at a later time. After step 1190, or if the array is not full at step 1170, in step 1200 the process returns to step 1110 to process the next foreign key. At point A in FIG. 1D, if there are no more foreign keys to pass in step 1110, then in step 1210 the intermediate file is read to locate each array that has been stored. In step 1230, each array in the intermediate file is merged into a single string to arrange all of the sorted foreign keys from each array into a single collated sequence. In step 1230, each collated foreign key is passed to the E35 subroutine for constraint checking, for example as described in FIG. 1A.

Many of the steps identified in FIGS. 1B–1D require I/O operations. For example, managing the current array, placing the foreign key values in the proper sequence in the current array, writing the current array into an intermediate file, reading the intermediate file and merging the arrays stored in the intermediate file all require I/O operations, usually to process millions of foreign keys used in a conventional relational database system. Performing such numerous I/Os, as required when sorting is done, adds significant processing time to the constraint checking operation. According to an exemplary embodiment of the present invention, the above-described sorting operation is eliminated when constraint checking is performed.

Thus, the prior art approach to constraint checking reads each row of the tablespace, extracts the foreign keys involved in the referential integrity constraint check, sorts the extracted key values, and compares the sorted foreign keys against the parent index. In addition, to the extent multiple database tables are subject to constraint checking and some of the tables have the same parent index, the parent index is read each time constraint checking is performed. Moreover, conventional constraint checking always perform a sort operation and provides no mechanism for determining if the use of a sort utility provides the optimal method for performing constraint checking. The use of a sort utility involves numerous I/O operations that can significantly slow down the constraint checking process. Accordingly, eliminating the sort operation in constraint checking can significantly reduce the time required to perform constraint checking.

SUMMARY OF THE INVENTION

According to the present invention, performance of constraint checking is enhanced by dynamically determining an optimal process to perform the checking operation. For example, if additional dataspace can be allocated for storing parent indexes, the parent index is stored in the dataspace and a binary search is performed between the extracted foreign keys and the dataspace, thereby eliminating the need for a sort operation on extracted foreign keys to perform constraint checking. If all of the parent indexes needed for constraint checking cannot be stored in additionally allocated dataspace, then as many parent indexes as possible are stored in additionally allocated dataspace and multiple reader and multiple sort tasks are utilized to process the remaining the parent indexes. Depending on the availability of resources and the characteristics of the database table, determined dynamically, optimization of the constraint checking operation is accomplished.

DETAILED DESCRIPTION OF THE INVENTION

Figure 1A:
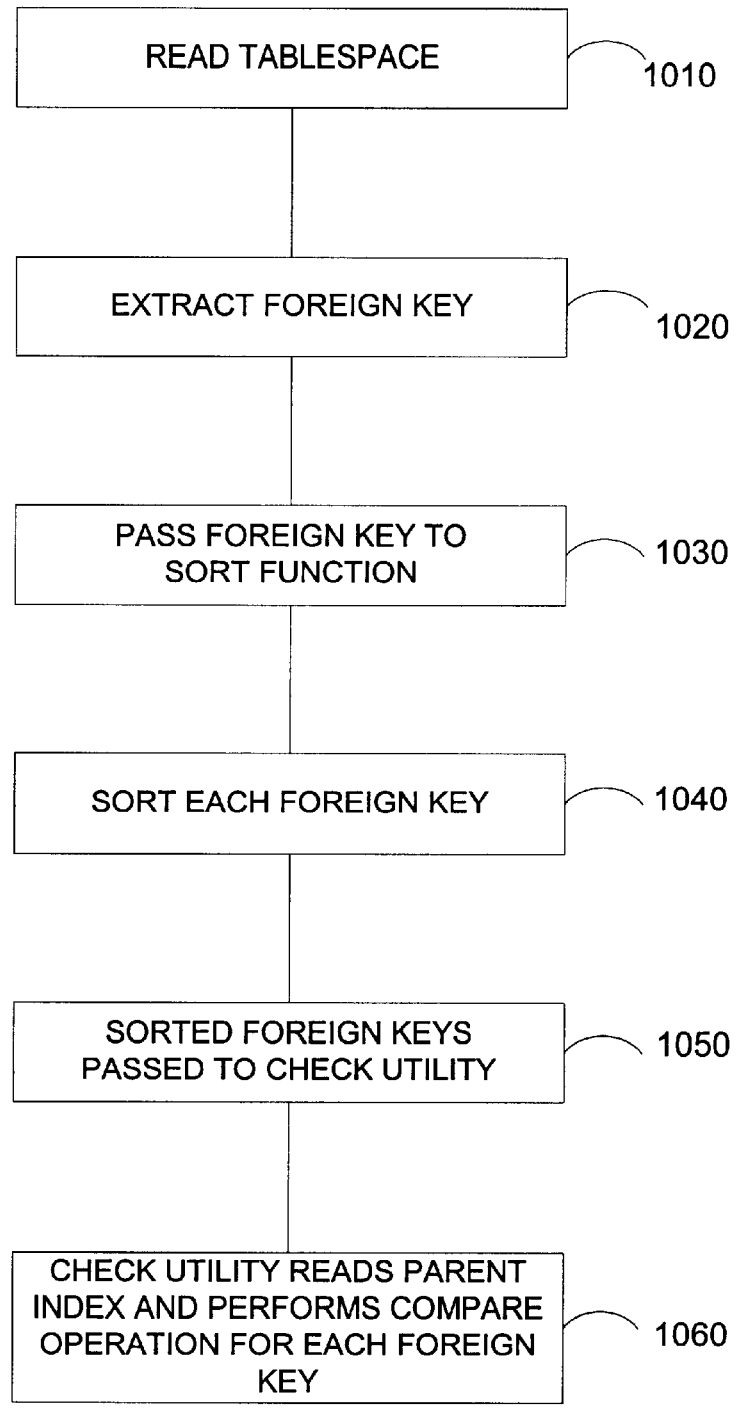
FIG. 1A illustrates an exemplary flowchart of a prior art approach to constraint checking.
Figure 1B:
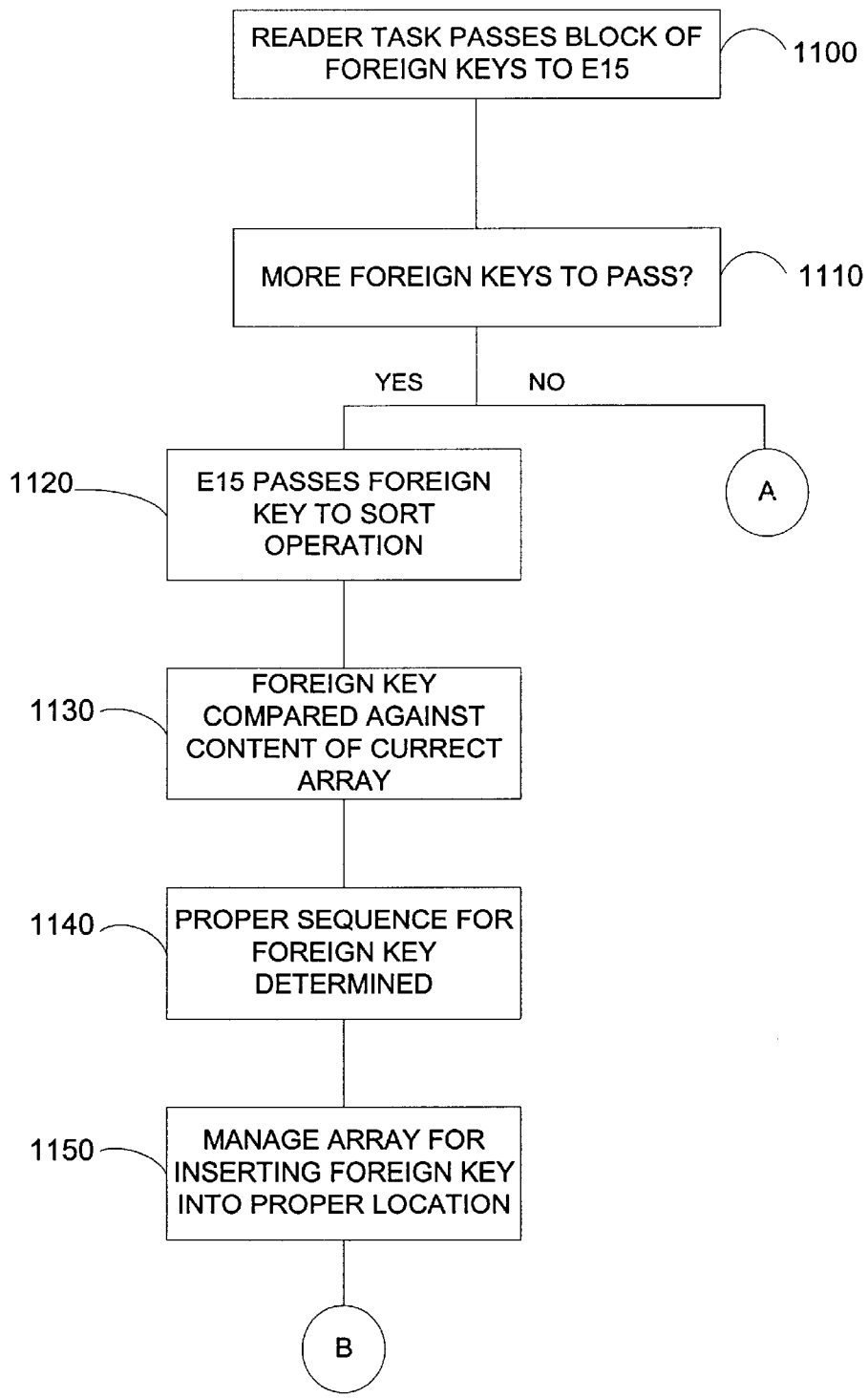
FIG. 1B illustrates an exemplary flowchart for a portion of a prior art sort task operation.
Figure 1C:
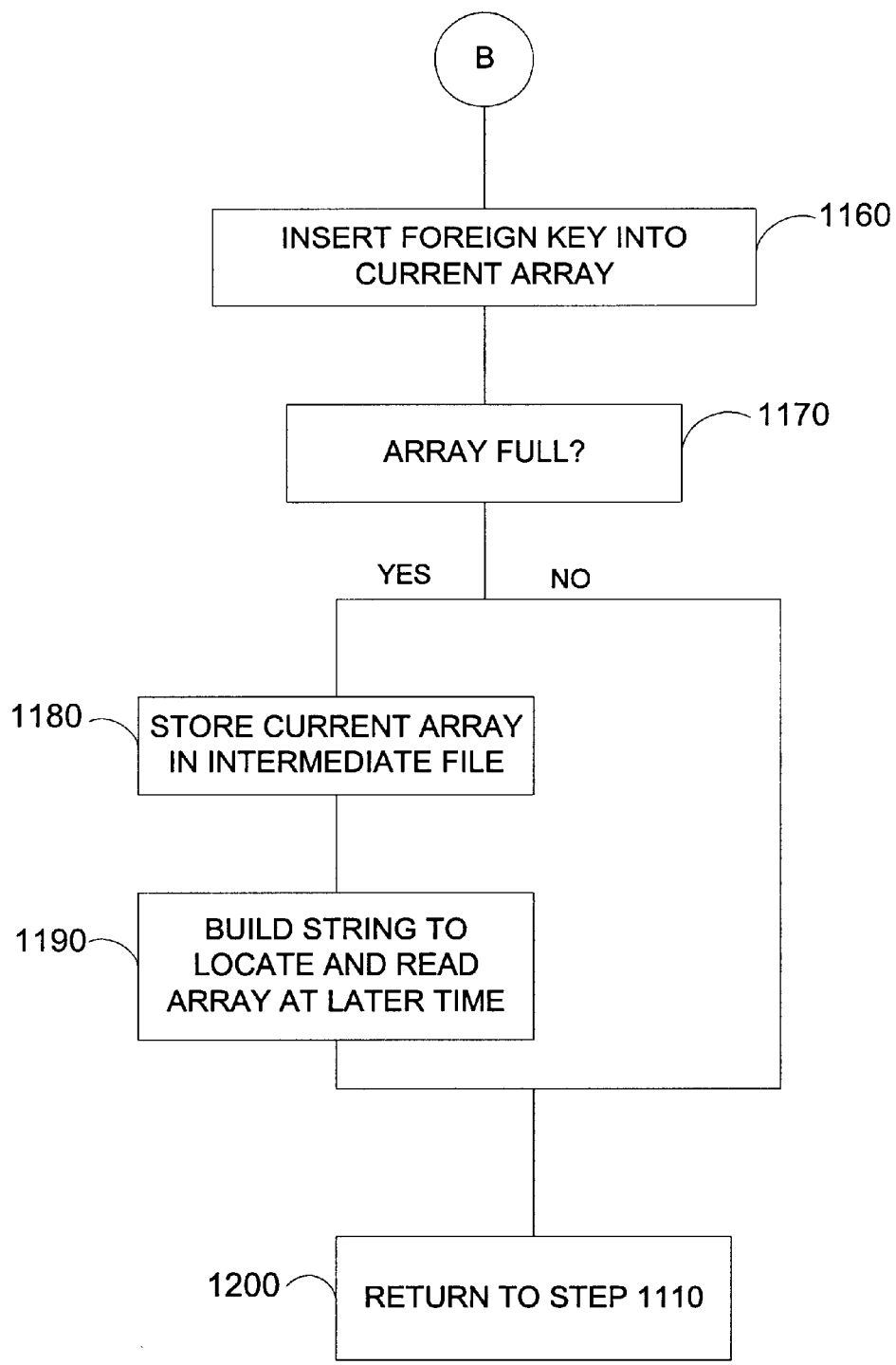
FIG. 1C illustrates an exemplary flowchart for another portion of a prior art sort task operation.
Figure 1D:
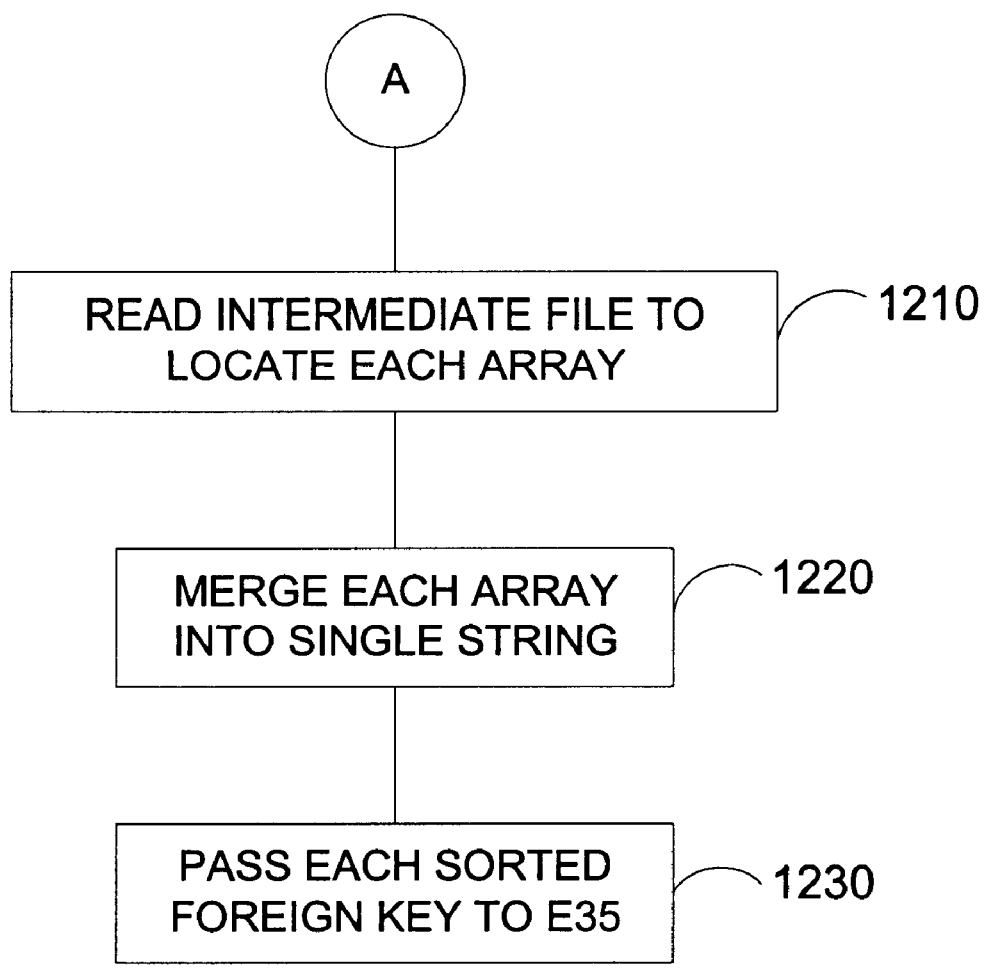
FIG. 1D illustrates an exemplary flowchart for another portion of a prior art sort task.
Figure 2A:
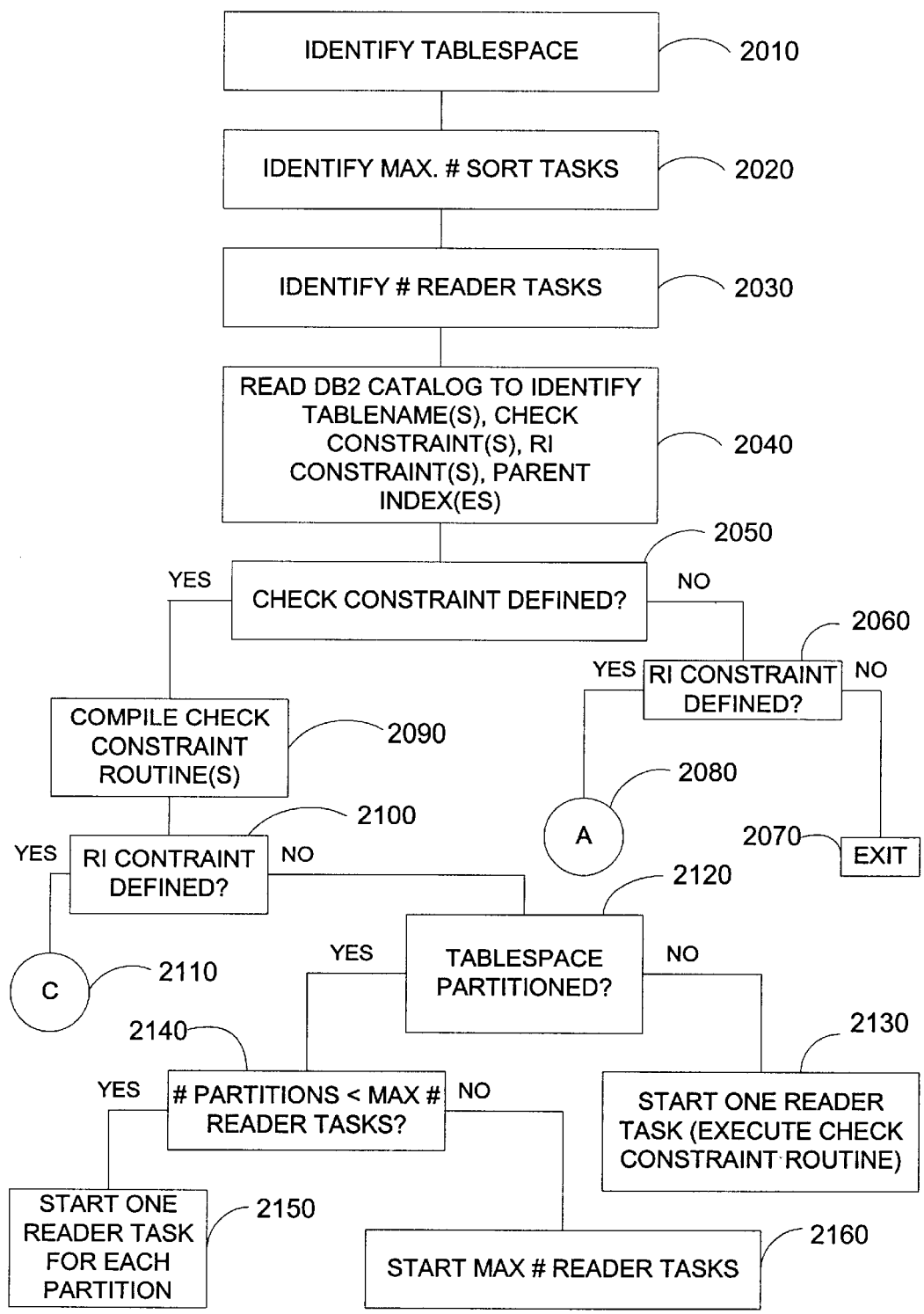
FIG. 2A illustrates a portion of an exemplary flowchart for constraint checking according to an exemplary embodiment of the present invention.
Figure 2B:
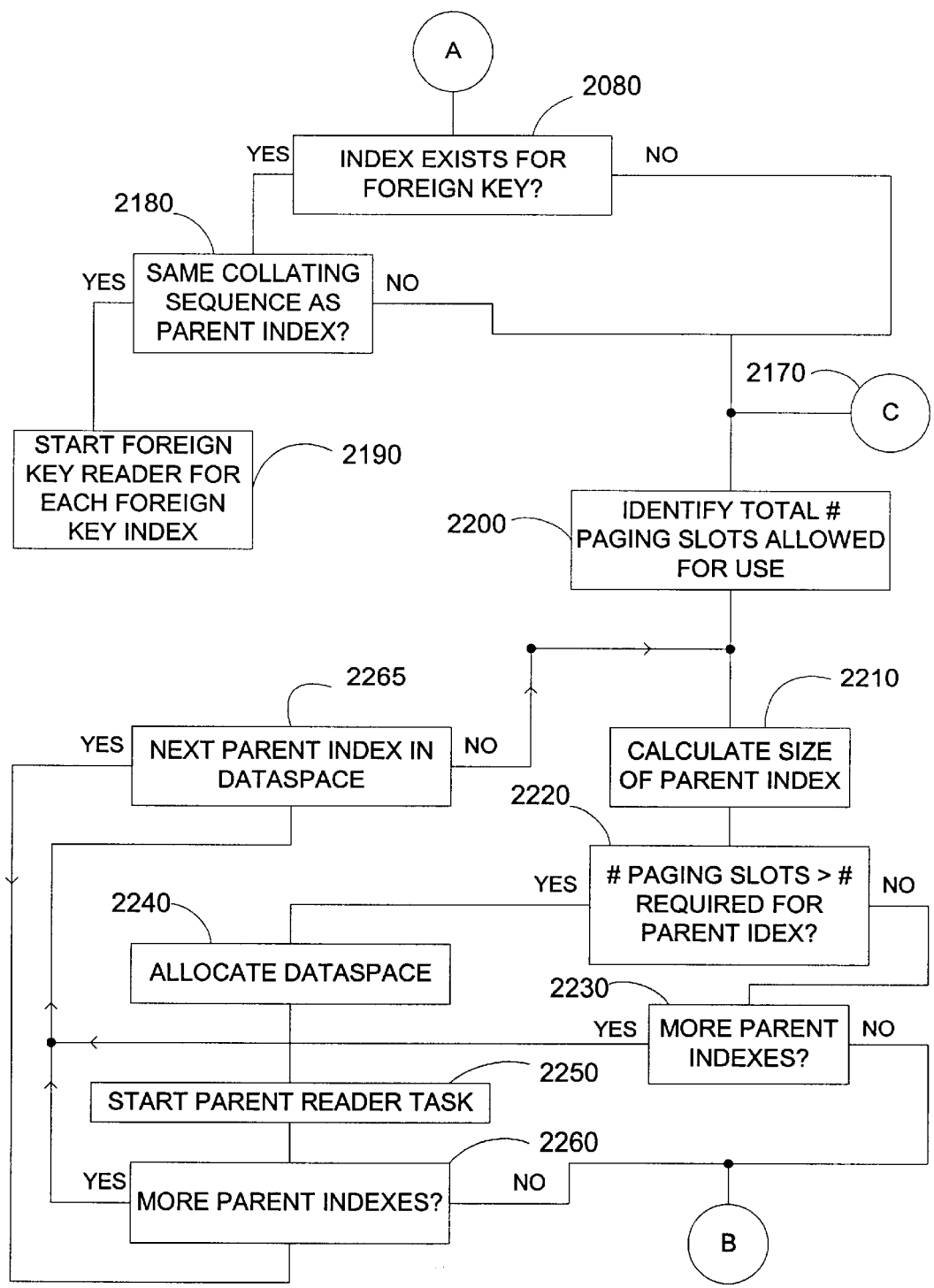
FIG. 2B illustrates another portion of an exemplary flowchart for constraint checking according to an exemplary embodiment of the present invention.
Figure 2C:
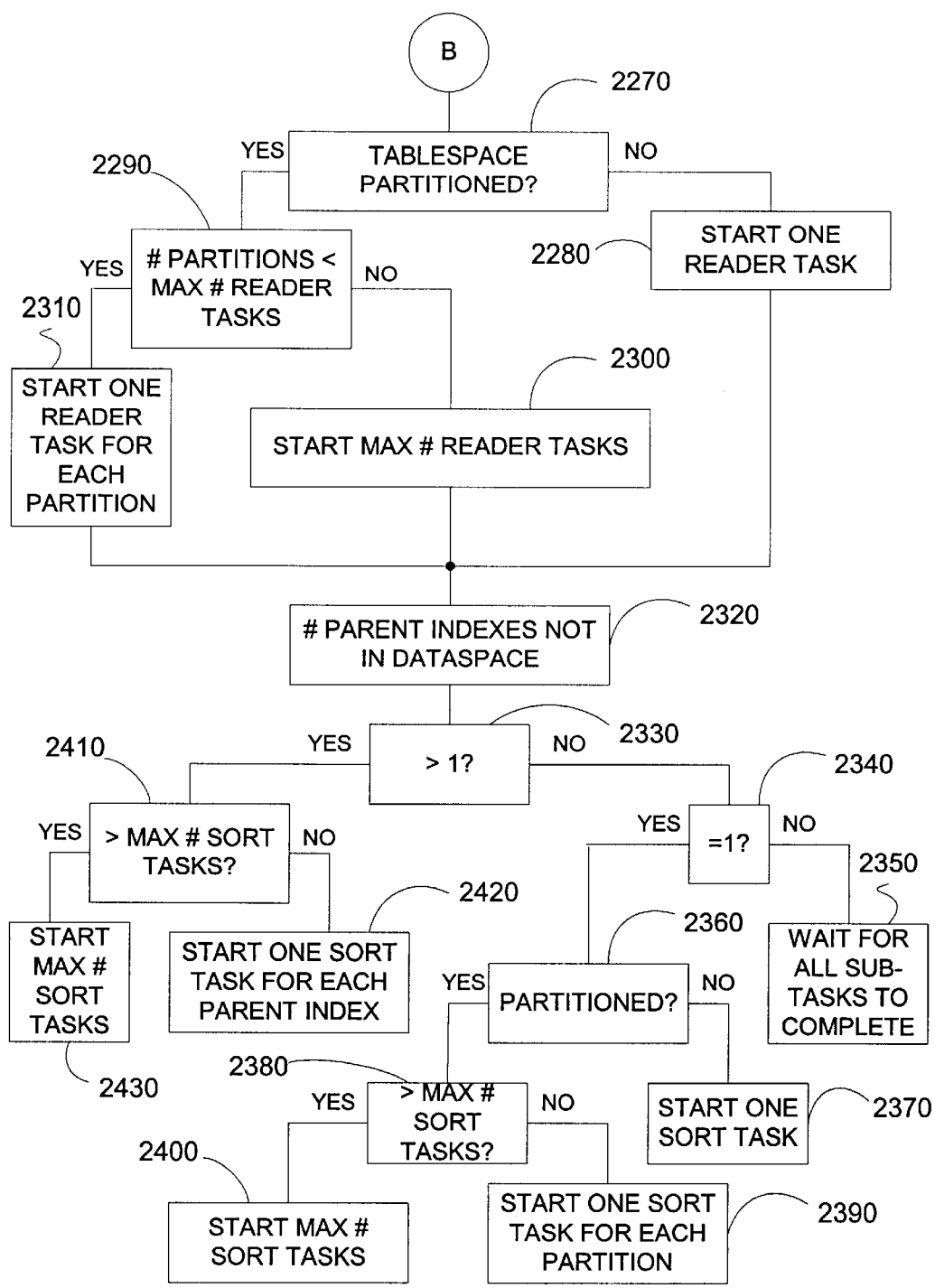
FIG. 2C illustrates another portion of an exemplary flowchart for constraint checking according to an exemplary embodiment of the present invention.

FIGS. 2A–2C illustrate an exemplary method for constraint checking according to an embodiment of the present invention.

The exemplary method can be implemented in software, firmware or hard-wired logic, for example, as part of a check utility that performs constraint checking.

As shown in FIG. 2A, in step 2010 a tablespace is identified. For example, a user of a check utility would start the initialization process for the check utility and input the name of the tablespace. In step 2020, a maximum number of sort tasks is identified, specifying the maximum number of sort tasks that the check utility can use. The default value can be, for example, one. In step 2030, the number of reader tasks is identified. The default number of reader tasks that can be used by the check utility is, for example, nine. The number of sort tasks and reader tasks can be set by the user of the check utility. For example, when a user wants to execute a check utility in a MVS environment, a control statement must be provided. An exemplary control statement to set the number of sort tasks and reader tasks is as follows.

CHECK DATA
   TABLESPACE dbname.esname
   SORTTASKS 5
   READTASKS 9

As is known in the art, a tablespace reader task is, for example, a tablespace reader that reads a tablespace and extracts the foreign key or keys from each row of the tablespace. Similarly, a parent index reader task reads a parent index into a dataspace. A foreign key index reader task reads a foreign key index and compares the foreign keys against a parent index, as described below.

Using the tablespace identified in step 2010, in step 2040 the DB2 catalog is read to identify information needed to process the tablespace, for example, tablename(s) contained in the tablespace, check constraint(s) defined for any tables in the tablespace, referential integrity constraints defined for any tables in the tablespace and the parent index(es) for any referential integrity constraints.

The name of the table in the tablespace identified by the user can be obtained by the check utility reading the DB2 catalog (e.g., the SYSIBM.SYSTABLE table in the catalog). For example, the following is an example of how to read the SYSTABLE table in the DB2 catalog:

SELECT NAME, CREATOR, CHECKS
   FROM SYSIBM.SYSTABLE
   WHERE TSNAME=#TS_NAME AND
   DBNAME=#TS_NAME;

The above example returns the name of the task, the creator of the table and the number of check contraints defined for the table (e.g., 0–200).

Applicable check constraints can be identified, for example, by the check utility reading the D92 catalog (e.g., the SYSIBM.SYSCHECKS table in the catalog) to identify any check constraints that apply to the table. The check constraints that apply, if any, are defined when the table is originally created in the database system and are stored in the DB2 catalog, which can be subsequently queried for the information. For example, if reading the SYSTABLE indicates that check constraints are defined for the table, the following is an example of how to read the SYSCHECKS table in the DB2 catalog:

SELECT CHECKNAME, CHECKCONDITION
   FROM SYSIBM.SYSCHECKS
   WHERE CREATOR=:#CCR_CREATOR,
     AND TBNAME=:#CCR_TBNAME.

If a check constraint is defined for the table, then the DB2 catalog returns a row value identifying the check constraint. The row value is the check predicate and check constraint routines are compiled and built, as is known in the art, by the check utility.

Applicable referential integrity constraints can be identified by, for example, the check utility reading the DB2 catalog (e.g., the SYSIBM.SYSRELS table of the catalog) for the table (e.g., for the order_entry table in the earlier example). The relational integrity constraints that apply, if any, are defined when the table is originally created in the database system and are stored in the DB2 catalog, which can be subsequently queried for the information as described above. For example, the following is exemplary code for how to read the SYSRELS table of the DB2 catalog.

```
SELECT REFTBNAME         ,
       REFTBCREATOR      ,
       RELNAME           ,
       IXOWNER           ,
       IXNAME            ,
  FROM SYSIBM.SYSRELS
       WHERE CREATOR = :#RELS_CHILD_CREATOR,
         AND TBNAME = :#RELS_CHILD_TBNAME;
```

If no referential integrity constraints are defined for the table, then, for example, an SQL code of +100 is returned by DB2. If any referential integrity constraints are defined for the table, however, then the DB2 catalog returns the row value for each referential integrity constraint parent table (e.g., the DB2 catalog provides the row of the SYSIBM.SYSRELS table having a column with the name of the parent table for the referential integrity constraint). For example, the SYSCOLUMNS table of the DB2 catalog can be read by the check utility to identify the names of columns and location in the row of referential integrity or check constraints. The following is an example of how to read the SYSCOLUMNS table of the DB2 catalog:

SELECT NAME, COLNO, COLTYPE, LENGTH,
   SCALE, NULLS, DEFAULT
   FROM SYSIMB.SYSCOLUMNS
   WHERE TBNAME=#TB_NAME AND
     TBCREATOR =#TB_CREATOR
   ORDER BY COLSEQ;

More than one row can be returned by the DB2 catalog if more than one referential integrity constraint is defined for the table. Using the order_entry table example, as two referential integrity constraints are defined for the table, the DB2 catalog would return the rows for the two parent tables (e.g., the customer table and the product table).

The check utility then reads the DB2 catalog to identify the column names for the foreign keys, for example by reading the SYSFOREIGNKEYS table in the DB2 catalog. Exemplary code for how to read the SYSFOREIGNKEYS table is set forth below.

```
SELECT
  CREATOR,
  TBNAME,
  RELNAME,
  COLNAME,
  COLSEQ
FROM SYSIBM.SYSFOREICNKEYS ORDER BY 1, 2,
  3, 5;
```

If referential integrity constraints are defined for a table, the parent index for each applicable referential integrity constraint is also identified by the check utility. For example, the check utility can read the DB2 catalog (e.g., the SYSIBM.SYSINDEX table of the DB2 catalog) for each parent table and the DB2 catalog will return the name of the parent index for the parent table. For example, the following is exemplary code for reading the SYSINDEX table of the DB2 catalog.

```
SELECT
  INDEXSPACE,
  UNIQUERULE
FROM SYSIBM.SYSINDEXES
  WHERE TBNAME=#RELS_CHILD_TBNAME,
    AND TBCREATOR=#RELS_CHILD_
    CREATOR;
```

If the parent index is partitioned, the number of partitions can be identified by reading the SYSINDEXPART table of the DB2 catalog. The names of the columns in the parent index can be identified by reading SYSKEYS table in the DB2 catalog. The following is an example of how to read the SYSINDEXPART and SYSKEYS tables of the DB2 catalog:

```
SELECT
  PARTITION
FROM SYSIBM.SYSINDEXPART
WHERE IXNAME=#IX_NAME AND
IBXCREATOR=#IX_CREATOR;
SELECT
  COLNAME, COLSEQ, ORDERING
FROM SYSIBM.SYSKEYS
WHERE IXNAME=#IX_NAME AND
  IXCREATOR=#IX_CREATOR
ORDER BY COLSEQ;
```

In addition to the above methods, the DB2 catalog can also be read using a proprietary IBM interface for querying the DB2 catalog or using VSAM or EXEP.

Returning to FIG. 2A, in step 2050, the method according to an embodiment of the present invention determines if any check constraints are defined for the table in the tablespace subject to constraint enforcement. If no check constraints are defined, then in step 2060 it is determined if any referential integrity constraints are defined for the table. If no referential integrity constraints are defined, then in step 2070 the constraint checking process ends as there are not any constraints to be enforced. If a referential integrity constraint is defined in step 2060, then the process continues at step 2080, discussed below.

If it is determined that a check constraint is defined in step 2050, then in step 2090 appropriate check constraint routines are compiled, in a manner as is known in the art. In step 2100 it is determined if a referential integrity constraint is defined for the table in the tablespace subject to constraint checking (e.g., if a referential integrity constraint was iden-tified during initialization of the check utility). If a referential integrity constraint is defined, then the process continues at step 2110, discussed below.

If no referential integrity constraints are defined in step 2100, then the tablespace needs to be read and check constraints enforced. Accordingly, in step 2120 it is determined if the tablespace is partitioned. Whether the tablespace is partitioned can be determined by reading the DB2 catalog. For example, the following is an example of how to read the DB2 catalog:

```
SELECT PARTITIONS, PGSIZE
FROM SYSIBM.SYSTABLESPACE
WHERE TSNAME=TS_TSNAME AND
  DBNAME=#TS_DBNAME;
```

If the tablespace is not partitioned, then one reader task is started in step 2130, for example by using the MVS ATTACH macro. The one reader task will read the records in the tablespace (e.g., the rows of the tablespace) and execute the check constraint routine(s) compiled in step 2090. According to an embodiment of the present invention, if the tablespace is partitioned, then in step 2140 it is determined if the number of partitions is less than the maximum number of reader tasks. If the number of partitions is equal to or greater than the maximum number of reader tasks, then in step 2160 the maximum number of reader tasks is started. If the number of partitions is less than the maximum number of reader tasks, then in step 2150, one reader task is started for each partition. As before, the reader tasks read the table space rows and execute the check constraint routine(s).

If step 2060 determines that a referential integrity constraint is defined for the table subject to constraint checking, then in step 2080 (marked as point A on FIG. 2B), it is determined if an index exists for the foreign keys. For example, although a foreign key is not usually used to define an index for a table due to the overhead associated with the foreign key (which may compromise the operating efficiency of the database system), in some instances the foreign keys may be indexed. If this is the case, then checking referential integrity would be faster by reading the foreign key index instead of the tablespace. For example, the foreign key index is smaller and would require less I/Os to read and, if the sequence of the foreign key index is the same as the parent index, then no sorting is required.

If an index exists for the foreign keys in step 2080, then in step 2180 it is determined if the foreign key index is in the same order as the parent index. If the foreign key index is in the same order as the parent index, then in step 2190 a foreign key reader task is started for each foreign key index. As is known in the art, a foreign key reader task is a subroutine for a reader task that reads the foreign key index and compares each foreign key with the parent index values to determine the validity of the foreign key (and thus the row of the tablespace). According to an embodiment of the present invention, multiple foreign key readers can be utilized in parallel to improve performance of the constraint enforcement.

Figure 4:
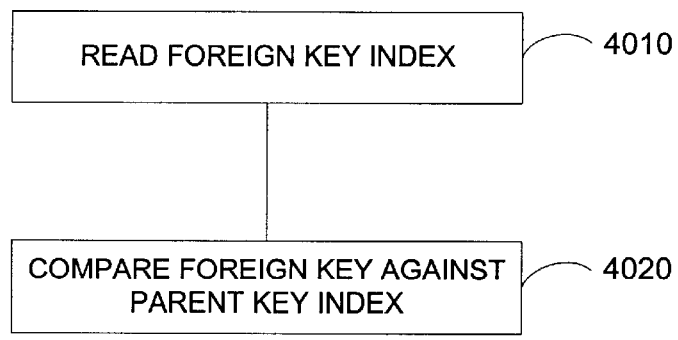
FIG. 4 illustrates an exemplary flowchart for operation of a foreign key reader task according to an exemplary embodiment of the present invention.

An exemplary flowchart for the operation of a foreign key reader task according to an embodiment of the present invention is illustrated in FIG. 4

If no index exists for the foreign keys, then in step 2200, the total number of paging slots available for use is identified. The total number of paging slots available for use can be determined by starting with a predetermined value, such as 70% of the total number of paging slots, selected via a control statement to the check utility when the check utility is initialized, and subtracting from this amount the number of paging slots already in use. For example, if 70% of the paging slots are allowed for use and 60% are actually in use, then 10% of the paging slots are available for use in accordance with an embodiment of the present invention.

As is known in the art, a paging slot is an assigned location in virtual storage. For example, instead of storing programs in real storage (e.g., a hard disk drive of a mainframe computer), the MVS operating system allocates memory needed by programs in virtual storage (e.g., using a portion of real storage like memory). The percentage utilization of paging slots can be determined by using the services of the MVS operating system or by using a subroutine. For example, the MVS operating system provides a macro to access the data structures in use to determine the percent utilization of paging slots. Exemplary code for a subroutine that determines the percent utilization of paging slots is provided below.

```
UTARRPAG    TITLE   'PLATINUM UTILITIES - UTARRPAG'
            UTMGBL  REL=R0402,COPYRIGHT PLATINUM technologies (1998)
*******************************************************************
*           PRODUCT.                                               *
*              PLATINUM UTILITIES FOR DB2                          *
*                                                                  *
*              CHECK PAGING SYSTEM FOR AVAILABLE SLOTS             *
*                                                                  *
*           PROGRAM.                                               *
*              UTARRPAG                                            *
*                                                                  *
*           ABSTRACT.                                              *
*                                                                  *
*                                                                  *
*           ENTRY PARAMETERS.                                      *
*                              -       NONE                        *
*                                                                  *
*           EXIT PARAMETERS.                                       *
*              R15             -       = TOTAL SLOTS               *
*              R0              -       = TOTAL ACTIVE PAG DATASETS *
*              R1              -       = TOTAL AVAILABLE SLOTS     *
*                                                                  *
*           REGISTER USAGE.                                        *
*              R12             -       BASE REGISTER               *
*              R11             -       BASE REGISTER               *
*                                                                  *
*                                                                  *
*           ERRORS DETECTED.                                       *
*                   (NONE)                                         *
*                                                                  *
*           ADDRESSING MODE.                                       *
*                   31 BIT                                         *
*                                                                  *
*******************************************************************
            TITLE   'APPLICATION DSECTS'
*******************************************************************
*                  APPLICATION DSECTS                              *
*******************************************************************
            PTMREGS
            CVT     DSECT=YES,PREFIX=NO
*
*******************************************************************
*************         ASM VECTOR TABLE MAPPING     ****************
*******************************************************************
ASMVT       EQU     0,1280,C'C'     ASM VECTOR TABLE
ASMPART     EQU     8,4,C'A'        ADDRESS OF PAGING ACTIVITY
*                                   REFERENCE TABLE - PART
ASMSLOTS    EQU     112,4,C'A'      COUNT OF TOTAL LOCAL SLOTS IN
*                                   ALL OPEN LOCAL PAGE DATASETS
*
*
*******************************************************************
*************         PART HEADER MAPPING          ****************
*******************************************************************
PART        EQU     0,24656,C'C'    PAGING ACTIVITY REFERENCE TABLE
PARTHDR     EQU     0,80,C'C'       PART HEADER, CONTAINS GENERAL
*                                   INFORMATION ABOUT PAGE DATASETS
PARTIDEN    EQU     0,4,C'C'        "PART" IDENTIFIER (COMMON)
PARTSIZE    EQU     4,4,C'F'        TOTAL NUMBER OF ENTRIES IN THE
*                                   PART, USED OR UNUSED (COMMON)
PARTEUSE    EQU     8,2,C'H'        TOTAL NUMBER OF PART ENTRIES
*                                   CURRENTLY IN USE (COMMON)
PARTLAST    EQU     10,2,C'H'       INDEX NUMBER OF THE LAST PARTE
```

-continued

```
*                               WHICH IS IN USE (ZERO BASED)
*                               (COMMON)
PARTLCNT   EQU   32,2,C'H'      COUNT OF ACTIVE LOCAL
*                               PAGE DATASETS
PARTLOCA   EQU   52,4,C'A'      ADDRESS OF THE PARTE FOR THE
*                               FIRST LOCAL PAGE DATASET
PARTLSTA   EQU   56,4,C'A'      ADDRESS OF THE PARTE FOR THE
*                               LAST IN-USE LOCAL PAGE
PARTENTS   EQU   80,96,C'C'     THE PART ENTRIES (256 OF 'EM)
***********************************************************************
*****************       PART ENTRY MAPPING       *********************
***********************************************************************
PAREPARE   EQU   0,4,C'A'       POINTER TO NEXT PARTE IN USE
*                               (COMMON)
PARETYPE   EQU   8,1,C'X'       PAGE DATASET TYPE FLAGS
PAREPLPA   EQU   X'80'          PLPA DATASET FLAG
PARECOMM   EQU   X'40'          COMMON DATASET FLAG
PAREDPLX   EQU   X'20'          DUPLEX DATASET FLAG
PARELOCL   EQU   X'10'          LOCAL DATASET FLAG
PAREPD     EQU   X'02'          PAGEDEL IN PROCESS FLAG
*                               1 = PAGEDEL IS PROCESS FOR
*                               THIS DATASET 0 = PAGEDEL IS
*                               NOT ACTIVE (COMMON)
PAREDRN    EQU   X'01'          DRAINING FLAG.  1 = DATSET IS
*                               DRAINING 0 = DATASET IS NOT
*                               DRAINING (COMMON)
PAREFLG1   EQU   9,1,C'X'       PAGE DATASET TYPE FLAGS
PARENUSE   EQU   X'80'          PARTE NOT IN USE FLAG.
*                               1 = PARTE IS NOT IN USE, 0 =
*                               PARTE IS IN USE. (COMMON)
PAREDSBD   EQU   X'40'          DATASET BAD FLAG. 1 = ASM
*                               HAS MARKED THIS DATASET BAD.
*                               IT IS NO LONGER BEING USED
*                               FOR WRITE AND IS EFFECTIVELY
*                               READ-ONLY. 0 = DATASET IN
*                               NORMAL READ/WRITE USE. (COMMON)
PARESLTA   EQU   20,4,C'A'      NUMBER OF CURRENTLY AVAILABLE
*                               SLOTS ON THE DATASET (COMMON)
PAREFLG2   EQU   64,1,C'X'      FLAG BYTE
PAREPKER   EQU   X'10'          PACK ERROR FLAG. 1 = DATASET
*                               IS BAD DUE TO PACK ERROR 0 =
*                               DATASET NOT BAD DUE TO PACK
*                               ERROR (COMMON)
***********************************************************************
           TITLE 'UTARRPAG - MAIN LOGIC ROUTINES'
* *********************************************************************  *
*          APPLICATION MAIN PROCESS                                       *
* *********************************************************************  *
UTARRPAG   AMODE  31
UTARRPAG   CSECT
           USING  UTARRPAG,R15            SET ADDRESSABILITY
*
           B      UT_START                BEGIN
*
***   PRODUCT RELEASE CONSTANTS
*
UT_PGMID   DC     CL8'UTARRPAG'           APPLICATION ID
           GBLC   &RELNO, ©RIGHT
UT_RELNO   DC     CL5'&RELNO'             VERSION NUMBER
           DC     CL8'&SYSDATE'           COMPILE DATE
           DC     CL8'&SYSTIME'           COMPILE TIME
           DC     C'COPYRIGHT ©RIGHT' COPYRIGHT DATA
           DC     C'PLATINUM TECHNOLOGY, INC '   X
           DC     C'ALL RIGHTS RESERVED'        X
*
UT_START   DS     OH
           STM    R14,R12,12(R13)         SAVE REGISTERS
           L      R2,CVTPTR               GET CVT ADDRESS
           USING  CVT,R2
           L      R3,CVTASMVT             GET ASMVT
           L      R9,ASMSLOTS(,R3)        = TOTAL SLOTS
           L      R6,ASMPART(,R3)         = PAGING REFERENCE TABLE (PART)
           LH     R5,PARTLCNT(,R6)        = TOTAL LOCAL DATASETS
           SR     R7,R7
           LA     R4,PARTENTS(,R6)        = FIRST PARTE SLOT
           L      R8,PARTSIZE(,R6)        = NUMBER OF PARTE SLOTS
*
MAIN_0050  DS     OH                      BACK TO HERE FOR ALL PARTE SLOTS
           TM     PARETYPE(R4),PARELOCL   LOCAL DATASET ?
```

```
            BZ     MAIN_0100              NO
*
            TM     PARETYPE(R4),PAREDRN   DRAINING ?
            BO     MAIN_0100              YES
*
            TM     PAREFLG1(R4),PARENUSE  INUSE ?
            BO     MAIN_0100              NO
*
            TM     PAREFLG1(R4),PAREDSBD  BAD - NO LONGER ACCEPTING
            BO     MAIN_0100              YES
*
* ADD TOTAL AVAILABLE SLOTS
*
            A      R7,PARESLTA(,R4)       = AVAILABLE
*
MAIN_0100   DS     0H
            LA     R4,L'PARTENTS(,R4)     = NEXT PARTE
            BCT    R8 MAIN_0050           LOOP FOR ALL PARTE
*
*----------------------------------------------------------------
*           GENERAL RETURN LOGIC
*----------------------------------------------------------------
RETURN      DS     0H
            ST     R9,16(,R13)            SET TOTAL ALLOCATED SLOT
            ST     R5,20(,R13)            SET TOTAL DATASETS IN R0
            ST     R7,24(,R13)            SET ALLOCATED IN R1
            LM     R14,R12,12(R13)        LOAD RETURN ADDRESS
            BR     R14                    RETURN TO CALLER
            TITLE  'APPLICATION CONSTANTS/ EQUATES'
* **********************************************************  *
*           APPLICATION CONSTANTS                              *
* **********************************************************  *
            LTORG
*
            PUSH   PRINT
            PRINT  DATA
PATCH_AREA  DS     0H
            PTMPATCH ,
            POP    PRINT
*
            END
```

Once the total number of paging slots available for use is identified, then in step 2210, the size of the parent index for each referential integrity constraint is calculated. For example, the check utility can determine the size of each parent index. A method for determining the size of the parent index includes, for example, using MEDIA MANAGER or VSAM MVS services to identify the highest used relative byte address (RBA). To determine the number of dataspace blocks (and thus number of paging slots) needed to store the parent index, the following formula can be used: paging slots=high used RBA÷4096 (e.g., each paging slot is 4096 bytes).

If the number of paging slots available is greater than the number of slots required for storing the parent index, then in step 2240 the required dataspace is allocated. The allocated dataspace (e.g., memory) from step 2240 is used to temporarily store the parent key values for each parent index. The size of the allocated dataspace is determined, for example, as a function of the RBA.

The allocation of dataspace can be done, for example, by utilizing the service of the IBM MVS operating system to provide the dataspace (e.g., virtual storage) needed for storing the parent index entries. For example, exemplary macro instructions for allocating dataspace is shown below.

```
DSPSERV CREATE                                                        X
        NAME=#RELS_DSNAME,      a unique name for MVS use             X
        STOKEN=#RELS_DSTOKEN,   token for ALESERV macro use           X
        BLOCKS=#RELS_DSSIZE,    count of 4k pages in parent index     X
        ORIGIN=#RELS_DSORG      address of 1st byte of dataspace
ALESERV ADD,                                                          X
        STOKEN=#RELS_DSTOKEN,   from DSPSERV                          X
        ALET=#RELS_ALET,        dataspace id                          X
        AL=PASN                                                       X
```

In step 2250, a parent reader task is attached to the parent index to read the parent index values into the allocated dataspace. The reader subtasks, as is known in the art, will start reading the indexspace for each parent index and will then store the parent key values into the dataspace allocated for each parent index. The reader subtasks, as is known in the art, can run concurrently with other tasks, such as a SORT subtask. It should be understood that more than one dataspace can be allocated so that there is a dataspace for each parent index (corresponding to each referential integrity constraint defined for the table).

An example of the assembler instructions for how the parent key values are stored in dataspace is provided below.

```
        LA      R14,IXKEYVAL         POINT TO KEYVALUE
        LR      R3,R2                KEYLENGTH
        LR      R15,R2               MVCL LENGTH
        L       R2,#RELS_COUNT
        LA      R2,1(R2)             OFFSET OF ZERO SLOT IS UNUSED
        ST      R2,#RELS_COUNT
        MH      R2,#RELS_KEYLEN
        A       R2,#RELS_DSORG
        SYSSTATE ASCENV=AR           SET GLOBAL BIT FOR AR MODE
        LAM     R0,R15,=16F'0'       CLEAR EM
        LAM     2,2,#RELS_ALET       LOAD ALET OF SPACE INTO AR2
        SAC     512                  SWITCH TO AR MODE
*
        MVCL    R2,R14               COPY INTO DATASPACE
        SAC     0                    SWITCH TO PRIMARY
        SYSSTATE ASCENV=P            DITTO
 - Return to caller
```

In step 2260, it is determined if there are any more parent indexes to be read. If there are more parent indexes (e.g., if there is more than one referential integrity constraint defined for the table), then in step 2265 it is determined if the parent index has already been loaded into a dataspace. If the parent index has already been loaded into a dataspace, then the process returns to step 2260. If the parent index has not been loaded into a dataspace, then the process continues at step 2210, as illustrated in FIG. 2B. If there are no more parent indexes to be read in step 2260, then the process continues at point B.

If the number of paging slots available is not greater than the number of paging slots required for the parent index in step 2220, then in step 2230 it is determined if there are more parent indexes to be read. If there are more parent indexes, the process continues at step 2265 in the same manner as described above. If there are no more parent indexes to be read in step 2230, then the process continues at point B, which will involve the utilization of a sort utility to perform the constraint checking for the referential integrity constraint associated with the parent index that could not be allocated into dataspace.

At point B, illustrated as step 2270 in FIG. 2C, it is determined if the tablespace is partitioned. If the tablespace is not partitioned, in step 2280 a single reader task is started to read the rows of the tablespace and extract the foreign keys. If the tablespace is partitioned, in step 2290 it is determined if the number of partitions is less than the maximum number of reader tasks that are available. If the number of partitions is less than the maximum number of reader tasks, then one reader task is started for each partition in step 2310. Otherwise, the maximum number of reader tasks are started, the partitions being divided between the reader tasks so that approximately the same number of partitions are processed by each reader task. For example, if there are nine reader tasks and 62 partitions, reader task 1 will read partitions 1–7, reader task 2 will read partitions 8–14, reader task 3 will read partitions 15–21, etc., and reader task 9 will process partitions 57–62.

In step 2320, the number of parent indexes not in dataspace is counted. If there is more than one parent index not in dataspace, in step 2410 it is determined if the number of such parent indexes is greater than the maximum number of sort tasks. If not, then one sort task is started for each parent index in step 2420. If the number of parent indexes is greater than the maximum number of sort tasks, then in step 2430, the maximum number of sort tasks is started, the parent indexes being divided between the sort tasks so that approximately the same number of parent indexes are processed by each sort task.

If step 2330 identifies that either one or no parent indexes are not in dataspace, in step 2340 it is determined if exactly one parent index is not in dataspace. If not, then there are no parent indexes not in dataspace and in step 2350 the process waits for all subtasks to complete. If one parent index is identified in step 2340, in step 2360 it is determined if the parent index is partitioned. If the parent index is not partitioned, in step 2370, one sort task is started to sort the foreign keys to be compared to the parent index. If the parent index is partitioned, in step 2380 it is determined if the number of partitions is greater than the maximum number of sort tasks. If not, in step 2390, one sort task is started for each partition. Otherwise, in step 2400 the maximum number of sort tasks are started, the partitions being divided between the reader tasks so that approximately the same number of partitions are processed by each sort task. For example, if there are five sort tasks and 54 partitions, sort task 1 will process partitions 1–11, sort task 2 will process partitions 12–22, sort task 3 will process partitions 23–33, sort task 4 will process partitions 34–44 and sort task 5 will process partitions 45–54.

At this point in the process according to an exemplary embodiment of the present invention, a dynamic determination of the optimal method for constraint checking has been made. The process is dynamic because, for example, each tablespace and each parent index has a different configuration. In addition, the MVS operating workload at the time of execution of a check utility varies. Each of these factors is taken into consideration to determine how much dataspace can be allocated at the time of execution and how many parent indexes can be loaded into dataspace at the time of execution. Even if all parent indexes cannot be loaded into dataspace, as much of the process as possible is performed in parallel to minimize the records processed by each sort task, as the time required for a sort operation increases exponentially as the number of records to be sorted increases.

Figure 3A:
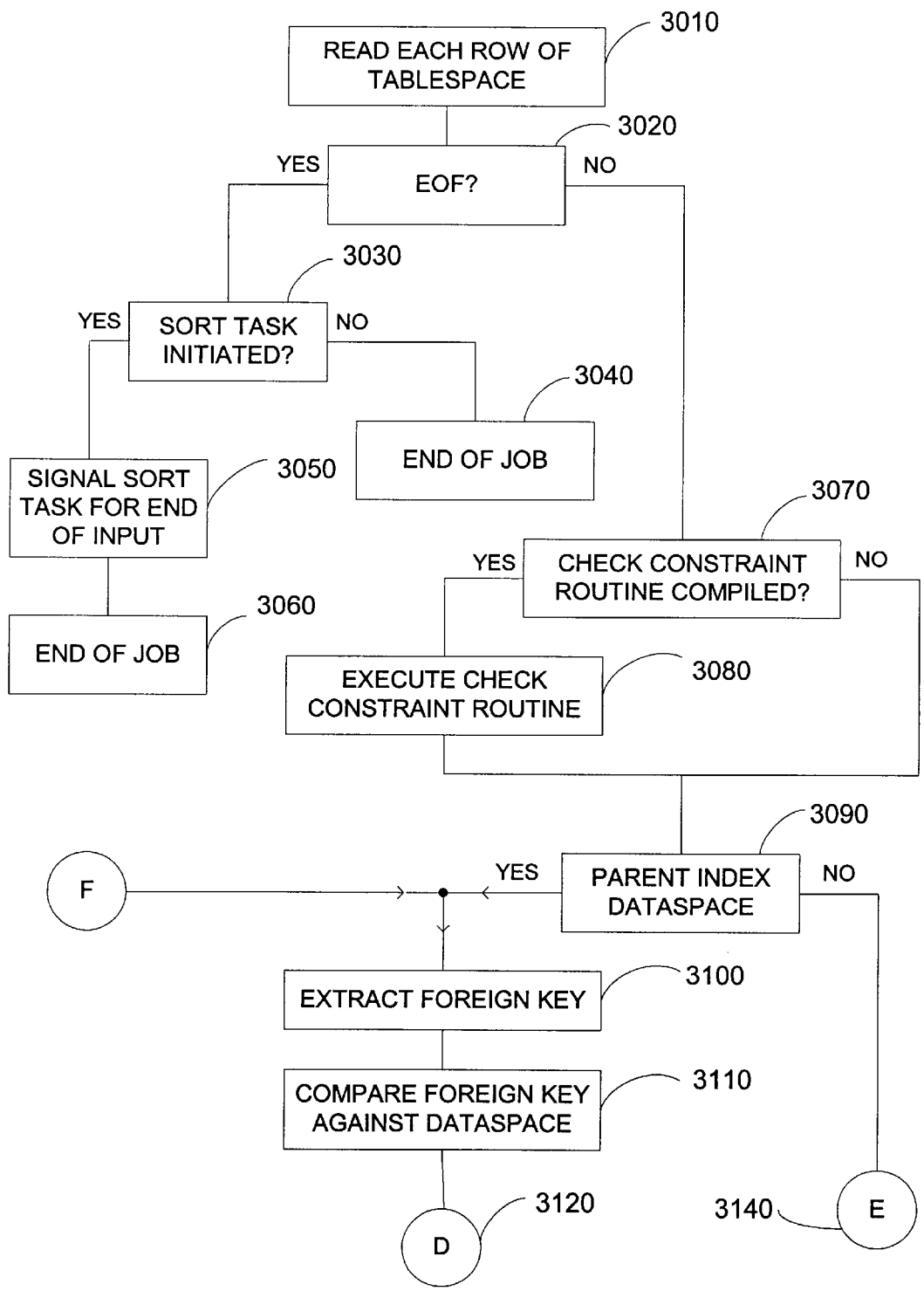
FIG. 3A illustrates a portion of an exemplary flowchart for operation of a reader task according to an exemplary embodiment of the present invention.
Figure 3B:
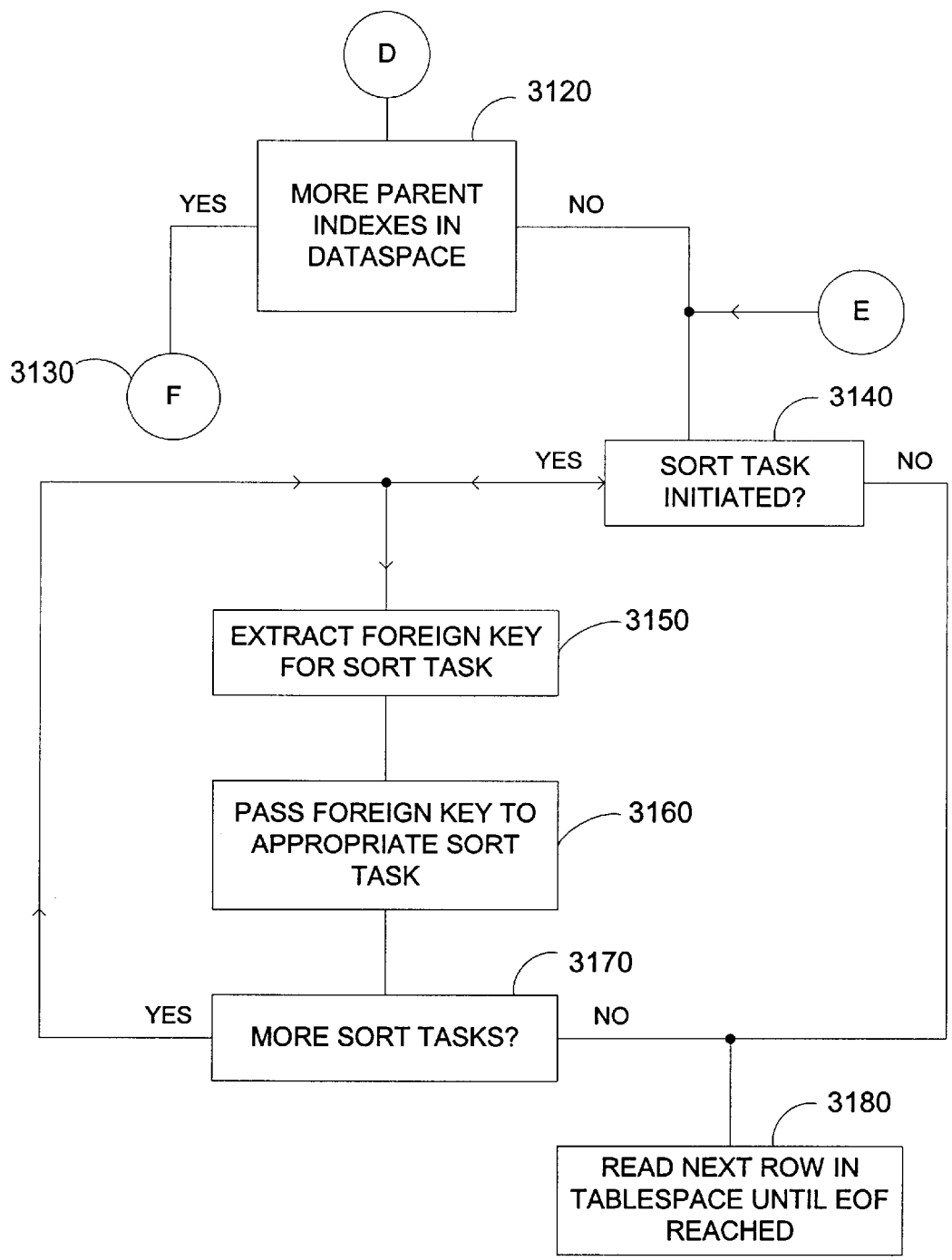
FIG. 3B illustrates another portion of an exemplary flowchart for operation of a reader task according to an exemplary embodiment of the present invention.

FIGS. 3A and 3B illustrate exemplary operation of a reader task according to an embodiment of the present invention. In step 3010, each row of the tablespace is read. In step 3020, it is determined if an end of file (EOF) condition exists (e.g., there are no more rows of the tablespace to be read). If the EOF condition exists, in step 3030 it is determined if the sort task has been initiated. If a sort task has not been initiated, then the end of job condition for the reader task is reached in step 3040. If a sort task has been initiated, then in step 3050 a signal is sent by the reader task to the sort task indicating the EOF condition for the input. The end of job condition for the reader task is reached in step 3060.

If no EOF condition is identified in step 3020, in step 3070 it is determined if a check constraint routine has been compiled. If a routine has been compiled, it is executed in step 3080. After step 3080 or if no check constraint routine was compiled, in step 3090 it is determined if the parent index for the referential integrity constraint has been loaded into dataspace in accordance with an embodiment of the present invention. If the parent index is not in dataspace, the process continues at point E, described below. If the parent index is in dataspace, in step 3100 the foreign key is extracted from the row of the tablespace. In step 3110 the foreign key value is compared against the dataspace.

For example, a binary search (e.g., a compare operation) is performed between the foreign key and the parent index dataspace (which stores the parent keys for the referential constraints). If more than one referential integrity constraint is defined for the table, then the check utility would select the appropriate parent index dataspace to perform the binary search. An example of assembler instructions for a binary search according to an embodiment of the present invention is set forth below.

```
*       DO A BINARY SEARCH ON THE FOREIGN KEY                              *
*= = = = = = = = = = = = = = = = = = = = = = = = = = = = = = = = = = = =   *
BINARY_SEARCH       @SUBIN
            LAM     0,15,=16F'0'                    CLEAR EM
            LAM     2,2,#RELS_ALET                  LOAD ALET OF SPACE INTO AR2
            SAC     512                             SWITCH TO AR MODE
            SYSSTATE ASCENV=AR                      SET GLOBAL BIT FOR AR MODE
            LM      R4,R5,#RELS_BIN_START           R4 = START SLOT NO, R5 = HALF
            LH      R3,KEYLENGTH                    KEYLENGTH
            BCTR    R3,0
CHECK       DS      0H
            LR      R2,R4                           SLOT NUMBER
            MH      R2,#RELS_KEYLEN                 OFFSET OF 1
            A       R2,#RELS_DSORG                  START OF DATASPACE
            EX      R3,COMPARE                      CLC  0(0,R2),KEYVALUE
            BL      PIPE_LOWER
            BH      PIPE_HIGHER
            B       SEARCH_END
PIPE_LOWER  DS      0H
            IF      (LTR,R5,R5,Z)
                    MVC  #FCM_RETURN_CODE,=F'4' NOT FOUND
                    OI   #FCM_REASON_CODE+3,X'02'
                    B    SEARCH_END
            ENDIF
            LR      R14,R4                          SAVE ORIGINAL SLOT
            AR      R14,R5
            SRL     R5,1                            DIVIDE BY 2
            IF      (C,R14,GT,#RELS_COUNT)
                    B    PIPE_LOWER
            ENDIF
            LR      R4,R14                          NEW SLOT
            B       CHECK
PIPE_HIGHER DS      0H
            IF      (LTR,R5,R5,Z)
                    MVC  #FCM_RETURN_CODE,=F'4' NOT FOUND
                    OI   #FCM_REASON_CODE+3,X'02'
                    B    SEARCH_END
            ENDIF
            SR      R4,R5
            SRL     R5,1                            DIVIDE BY 2
            B       CHECK
SEARCH_END  SAC     0                               SWITCH TO PRIMARY
            SYSSTATE ASCENV=P                       TELL ASSEMBLER
            LAM     2,2,=F'0'                       CLEAR IT
            @SUBOUT RESTORE=YES
COMPARE     CLC     0(0,R2),FOREIGN_KEY
```

If a match exists in the binary search, then, for example, a PASS code is generated by the check utility indicating that the row passed the constraint check and no corrective action is needed. If no match exists in the binary search then, for example, a FAIL code is generated by the check utility indicating that the row violates the constraint and requires corrective action, e.g., the row should be discarded.

In step 3120 it is determined if there are more parent indexes in dataspace. If there are more parent indexes in dataspace, then the process loops back to step 3100 to extract the next foreign key value in the row of the tablespace for comparison with the dataspace. This process continues for each parent index in dataspace.

If more parent indexes are stored in dataspace, the process returns to point F to process the next foreign key. If there are no more parent indexes in dataspace, the process continues at point E, identified as step 3140 in FIG. 3B. In step 3140, it is determined if a sort task has been initiated. If no sort task has been initiated, the next row in the tablespace is read until an EOF condition is reached. If a sort task has been initiated, in step 3150 the foreign key is extracted from the row of the tablespace for processing by the sort task. In step 3160, the foreign key is passed to the appropriate sort task. In step 3170, it is determined if more sort tasks have been initiated. If no more sort tasks have been initiated, the next row in the tablespace is read until an EOF condition is reached. If more sort tasks have been initiated, the process returns to step 3140 for each sort task that has been initiated.

Therefore, according to an exemplary embodiment of the present invention, the constraint checking process is improved by, for example, comparing the indexes on foreign keys against the parent index if the foreign key index matches the sequence of the parent index. If there is more than one foreign key, the comparison is performed in parallel. If there is no foreign key index, the parent indexes are read and the tablespaces are read, in parallel if possible, the parent indexes being loaded into dataspace where possible, to eliminate or reduce use of a sort process. As is known, the sort process takes exponentially longer as the number of records to be sorted increases. Accordingly, advantages of the method according to an embodiment of the present invention include elimination or reduction of sort operations, with the accompanying reduction in I/O operations, reading each parent index only once and reading parent indexes and tablespaces in parallel.

FIG. 4 illustrates an exemplary flowchart for operation of a foreign key reader according to an exemplary embodiment of the present invention. Such a foreign key reader would be used, for example, when an index exists for a foreign key and the index is in the same collating sequence as the parent index. In such a circumstance, checking the referential integrity would be faster by reading the foreign key index instead of the tablespace. In step 4010, the foreign key index is read. In step 4020, each foreign key value is compared against the parent index.

Figure 5:
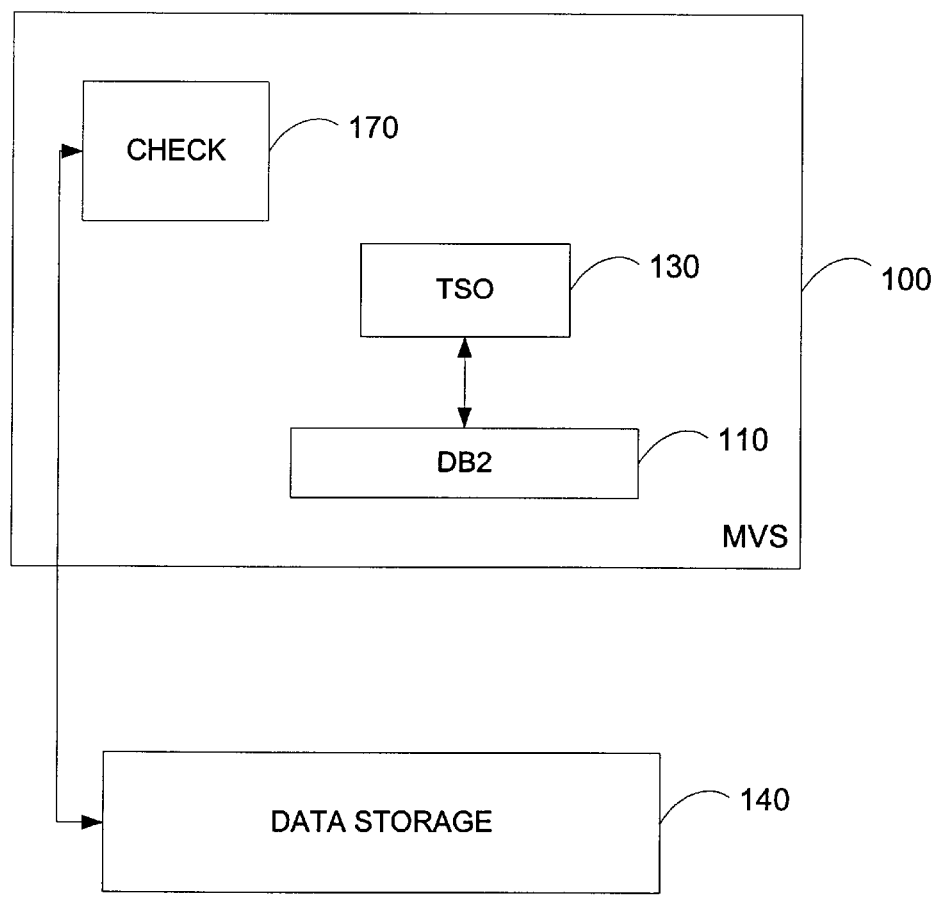
FIG. 5 illustrates an exemplary system for carrying out a method for constraint checking according to an embodiment of the present invention.

FIG. 5 illustrates an exemplary relational database system which employs a method for constraint checking according to an embodiment of the present invention. As shown in FIG. 5, the system includes a computer system 100 operating under, for example, the IBM MVS operating system software. The computer system 100 includes a DB2 database manager 110 which interacts with a direct access storage device (DASD) 140. An IBM Time Sharing Option (TSO) software function 130 is also included in computer system 100 which also interacts with the DB2 database manager 110 to, for example, read from and write to DASD 140. A check utility 170 is included in computer system 100, the check utility operating in accordance with an embodiment of the present invention, for example as described with respect to FIGS. 2–4. Check utility 170 includes, for example, a software program including an implementation of the method according to an embodiment of the present invention stored in memory of the computer system 100 (the memory also being referred to as address space).

What is claimed is:

1. A computer implemented method for checking constraints in a database table, comprising:

determining if a referential integrity constraint is defined for a database table;

if a referential integrity constraint is defined, dynamically determining if a parent index for the referential integrity constraint can be stored in a dataspace; and if the parent index can be stored in the dataspace,
      reading a content of the parent index into the dataspace,
      reading the database table, and
      comparing a foreign key for each row of the database table against the dataspace containing the content of the parent index.

2. The method according to claim 1, wherein the step of dynamically determining if the parent index can be stored in the dataspace includes the steps of:

identifying a total number of paging slots available for use; and determining a size of the parent index, wherein the parent index can be stored in the dataspace if the total number of paging slots exceeds a number of paging slots corresponding to the size of the parent index.

3. The method according to claim 1, wherein the step of comparing the foreign key for each row of the database table against the dataspace containing the content of the parent index includes a binary search operation.

4. The method according to claim 1, further comprising the step of, if the parent index cannot be stored in the dataspace:

reading the database table;

initiating a sort task for the parent index; and comparing the sorted foreign key against the parent index.

5. The method according to claim 4, wherein the step of reading the database table further includes extracting the foreign key from each row of the database table, and passing the extracted foreign key to the sort task.

6. The method according to claim 4, wherein the step of comparing the sorted foreign key is performed by a check utility program.

7. The method according to claim 5, further comprising the step of passing the extracted foreign key to an E15 for the sort task, the E15 passing the extracted foreign key to the sort task.

8. A computer implemented method for checking constraints in a database table, comprising:

determining if a referential integrity constraint is defined for a database table;

if a referential integrity constraint is defined, dynamically determining if a foreign key index is defined for the database table;

if a foreign key index is defined for the database table, reading the foreign key index and comparing a content of the foreign key index with a content of a parent index corresponding to the foreign key index;

if no foreign key index is defined for the database table, dynamically determining if the parent index for the referential integrity constraint can be stored in a dataspace;

if the parent index can be stored in the dataspace, reading the content of the parent index into the dataspace, reading the database table, and comparing a foreign key for each row of the database table against the dataspace containing the content of the parent index.

9. The method according to claim 8, wherein the step of reading the foreign key index and comparing the content of the parent index is performed if the foreign key index has a collating sequence corresponding to a collating sequence of the parent index.

10. A program storage device readable by machine, tangibly embodying a program of instructions executable by the machine to perform methods of checking constraints in a database table, comprising:

computer readable program means for causing a computer to determine if a referential integrity constraint is defined for a database table, computer readable program means for causing a computer to, if a referential integrity constraint is defined, dynamically determine if a parent index for the referential integrity constraint can be stored in a dataspace, computer readable program means for causing a computer to, if the parent index can be stored in the dataspace, read a content of the parent index into the dataspace, read the database table, and compare a foreign key for each row of the database table against the dataspace containing the content of the parent index.

\* \* \* \* \*